(12) United States Patent
Sarkisian et al.

(10) Patent No.: US 6,487,875 B1
(45) Date of Patent: Dec. 3, 2002

(54) AQUA-AMMONIA ABSORPTION SYSTEM GENERATOR UTILIZING STRUCTURED PACKING

(75) Inventors: Paul Sarkisian, Boulder City, NV (US); Lance D. Kirol, Morrisville, VT (US)

(73) Assignee: Rocky Research, Boulder City, NV (US)

( * ) Notice: Subject to any disclaimer, the term of this patent is extended or adjusted under 35 U.S.C. 154(b) by 0 days.

(21) Appl. No.: 09/632,037

(22) Filed: Aug. 3, 2000

(51) Int. Cl.$^7$ .............................................. F25B 33/00
(52) U.S. Cl. .......................................... 62/497; 62/476
(58) Field of Search ..................... 62/497, 476

(56) References Cited

U.S. PATENT DOCUMENTS

| | | | |
|---|---|---|---|
| 4,719,767 A | * 1/1988 | Reid, Jr. et al. | 62/476 |
| 4,722,193 A | * 2/1988 | Purvis et al. | 62/81 |
| 4,724,679 A | * 2/1988 | Radermacher | 62/101 |
| 4,902,207 A | * 2/1990 | Hembree et al. | 417/403 |
| 5,024,063 A | * 6/1991 | Erickson | 62/101 |
| 5,097,676 A | * 3/1992 | Erickson | 62/476 |
| 5,255,534 A | * 10/1993 | Ryan | 62/476 |
| RE34,747 E | * 10/1994 | Pretty et al. | 62/238.3 |
| 5,725,793 A | 3/1998 | Keller et al. | 252/69 |

FOREIGN PATENT DOCUMENTS

| | | |
|---|---|---|
| EP | 0 895 037 A2 | 2/1999 |
| JP | 7-318191 | 12/1995 |
| JP | 11-207173 | 8/1999 |
| JP | 55498 | 2/2000 |

\* cited by examiner

Primary Examiner—William Doerrler
Assistant Examiner—Mark Shulman
(74) Attorney, Agent, or Firm—Knobbe, Martens, Olson & Bear, LLP

(57) ABSTRACT

An aqua-ammonia absorption apparatus comprising an absorber assembly, a generator assembly, a condenser and an evaporator, the generator assembly comprising a boiler section, a solution-heated-desorber section, an adiabatic desorber or GAX desorber section, and a rectifier section, the interior space of at least one of said sections of said generator being substantially filled with structured packing material inert to an aqueous ammonia solution at generator temperatures.

104 Claims, 2 Drawing Sheets

AQUA-AMMONIA ABSORPTION SYSTEM GENERATOR UTILIZING STRUCTURED PACKING

BACKGROUND OF THE INVENTION

Aqua-ammonia absorption systems incorporate, as the major components, an absorber, generator, condenser, and an evaporator. Such systems, well known in the art, are disclosed, for example, in U.S. Pat. Nos. 5,367,884, 5,548,971, 5,367,884, and 5,490,393 the descriptions of which, including system components, features and operation, are incorporated herein by reference. These aqua-ammonia absorption systems may be designed and operated as heat pumps, refrigeration equipment, chillers, heating appliances, and chiller-heaters.

The generator of an aqua-ammonia absorption system operates as a distillation column and includes, as components, a boiler, a stripping section or stripper, and a rectifying section. The composition feed to the generator comprising an ammonia rich liquor from the system absorber, is introduced to the generator at one or more feed or inlet points. The boiler is designed to produce liquid and vapor counter-flow coincident with heat input. Prime heat is introduced over a finite length or height of the boiler resulting in significant change in ammonia concentration in the area of heat input. In some systems, the boiler is replaced by a reboiler in which heat is input from a prime energy source but with no substantial ammonia separation other than from vapor separating in equilibrium from the liquid near the bottom of the column. Thus, a reboiler simply returns vapor to the generator column.

The stripping section comprises all sections of the generator column which are below the highest (coldest) feed point. In the stripping section, heat is recovered from solution leaving the bottom of the distillation column with the recovered heat returned to the portion of the column above the boiler. The stripping section comprises three portions: a solution-heated-desorber (SHD) and either an adiabatic desorber or a generator-absorber heat exchange (GAX) desorber, and the boiler. The SHD is that portion of the stripping section which extracts heat from weak solution, i.e., solution from the bottom of the generator column, before the weak solution is routed to the absorber. The adiabatic desorber of the stripping section has no heat input and is typically located between the coldest feed point and the SHD. The GAX desorber receives heat from the absorber, either by heat transfer using weak liquor from the bottom of the generator column or a secondary fluid. Typically, a generator in a GAX aqua-ammonia absorption system will have a GAX desorber or an adiabatic desorber, but not both. When the system utilizes strong liquor GAX an adiabatic section is used, whereas a GAX desorber is used for weak liquor GAX or secondary fluid GAX. An additional component of a generator is a rectifier which is the section of the generator above the highest (coldest) feed point. Such generators as described above are illustrated in the drawings and will be described in further detail hereinafter.

The feed to the generator column from the system absorber is a rich liquor comprising a solution having a comparatively high ammonia content. Such rich liquor typically has 40% to 50% ammonia, but under some operating conditions may be as low as about 20%. Such a rich liquor is contrasted to a weak liquor directed from the generator to the absorber, which comprises a water-rich composition having between about 1% and about 15% ammonia at rating conditions, and typically between about 3% and about 5% ammonia. In strong liquor GAX absorption cycles, heat is recovered by splitting the rich liquor feed to the generator, one portion passing through the GAX heat exchanger in the absorber while the other portion is routed directly to the generator. The two portions are introduced into the generator at different locations. One feed stream is introduced at or near the rectifier as a single-phase fluid at or below the bubble-point temperature. The second stream, usually a two-phase composition, is introduced into the column at a lower location than the first single-phase liquid feed. The second feed stream desirably becomes a two-phase mixture by being when heated above its bubble-point temperature. Conventional generators used in the aforesaid aqua-ammonia absorption systems have been designed with plates and attached heat-transfer tubing to transfer heat to the distillation column at the various locations along the column length. Such generator columns are described and illustrated in the aforesaid patents.

SUMMARY OF THE INVENTION

The present invention is directed to an improved aqua-ammonia absorption generator having at least a portion of the interior generator space filled with structured packing material.

DETAILED DESCRIPTION OF THE PREFERRED EMBODIMENTS

Figure 1:
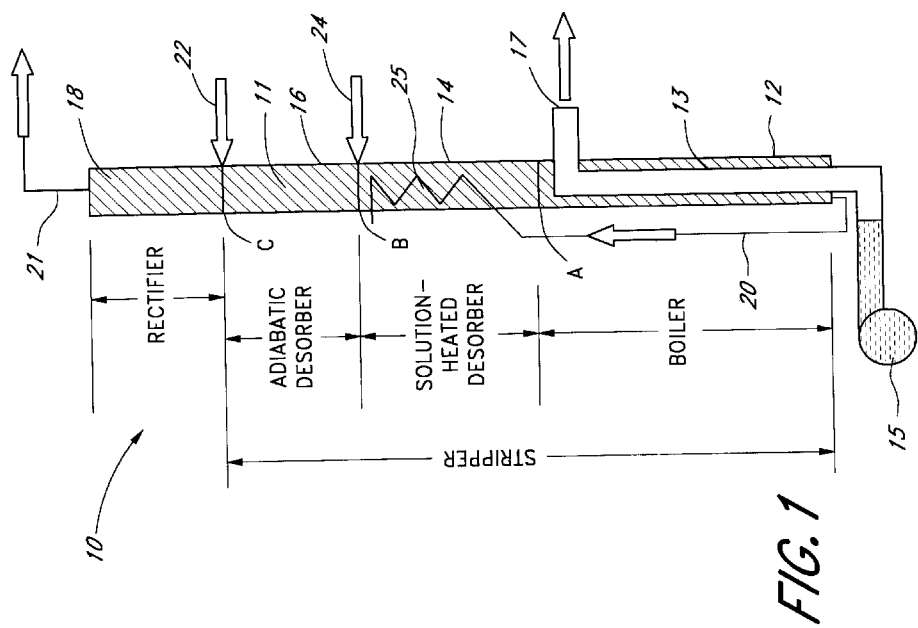

In the present invention, an improved aqua-ammonia absorption system generator uses structured packing material throughout a portion or all of the interior space of the generator column. In the embodiment of FIG. 1, generator 10 comprises four different sections within a single shell shown in an upright, vertical position as it is typically oriented and used in an aqua-ammonia absorption apparatus. The stripping section of the generator column is the combined boiler, SHD and adiabatic sections and is located at the hotter section of the generator below level C near the input of the first feed 22. Thus, the stripping section comprises all sections of the generator column below the highest (coldest) feed point while the rectifier is the section of the generator above the highest feed point. The coolest section of the column is rectifier 18, located above level C. Conduit 21 directs a refrigerant vapor from the rectifier to the condenser of the absorption apparatus. At the lower portion of the generator column is a boiler section 12 extending from the lowest end of the column to level A. Above the boiler is SHD section 14 positioned between levels A and B along the column length, position B being at the level that second feed 24 is introduced. Located above SHD section 14 is adiabatic desorber section 16 extending between level B and level C along the column length, level C corresponding to the first feed input 22. At the upper portion of generator 10 is rectifier 18 extending between level C and the upper end of the generator column. Although the generator 10 is illustrated as being a single or common shell made up of the different sections stacked vertically along the shell, the generator may be composed of one or more shells containing different sections as will be described hereinafter.

The boiler section 12 is heated by a burner 15 with a fire tube 13 extending along the length of the boiler section with the exhaust gases from the burner vented at end 17 of the fire tube. The burner provides heat to the boiler from a prime energy source. Heat from the boiler section is directed into the SHD section 14 via piping 20 using weak liquor. The heat exchanger 25 extending along the length of the SHD section 14 delivers sensible heat from the weak liquor.

The embodiment illustrated in FIG. 1 incorporates two liquid feed points. The first feed 22 is introduced into the column as a single-phase fluid at or slightly below the bubble-point temperature of the liquid. The feed is a rich liquor, as previously described, having typically 40% to 50% ammonia directed to feed input 22 from an absorber. The second feed input 24 is rich liquor absorption fluid directed from a GAX heat exchanger section of an absorber. The second feed stream is injected into the generator column at the location that separates the adiabatic desorber section 16 and the SHD section 14. The feed inlet devices include sprayers, jets, nozzles, distributors, headers, or other devices for uniformly distributing the liquid onto the structured packing material as will be understood and are known to those skilled in the art.

In the embodiment shown in FIG. 1, the interior of all sections of the generator column are packed with structured packing 11. However, the invention is not limited to packing all of the sections in the column, but instead selected sections may be packed. In many cases, it will be preferred or advantageous not to use structured packing in all sections. Thus, any one or more of the sections may incorporate structured packing. The structured packing is intended to replace typical interior generator components presently installed in the various generator sections, such as trays, coils, baffles, etc. Structured packing as used herein comprises a material that is substantially homogenous with repeating patterns and comprising adjacent or superimposed layers of flattened tubular mesh elements. The structured packing has a substantially uniform density throughout its mass. An example of a structured packing material used in a generator column of the present invention is disclosed in U.S. Pat. No. 4,014,557, the description of which is incorporated herein by reference. An example of a commercial structured packing material is marketed by Metex Corporation under the registered mark Goodloe®. Another commercially available structured packing is Optic-Pack, also marketed by Metex Corporation. Such a material may be formed from fine wire, knitted into a tubular form, which is then flattened to form a strip and given a crimp angle at 45° with the axis of the strip. Two of such strips are rolled together, one of the strips being turned so that the crimps cross each other, and the roll forms a cylindrical cartridge. The cartridge is rolled slightly larger than the inside diameter (ID) of the column into which it is to be installed. Such cartridges have a resiliency that allows them to be packed snugly into the column leaving substantially no bypass channels. In this embodiment, the various generator sections in which structured packing is used do not contain conventional interior generator column components such as trays. However, one or more of the sections of the column may contain a central flue pipe and/or a heat transfer coil adjacent to the generator shell wall. Thus, for example, in a cylindrical shell section having a concentric flue pipe extending along the section length, an annular space between walls of the shell and the pipe is filled with the structural packing material, as shown in FIG. 1. The structured packing material may be fabricated from any material inert to the water-ammonia solution at temperatures encountered in the generator. Typical operating temperatures are above about 200° F. up to about 400° F., or higher, although rectifier temperatures are about 200° F. or less. Such material is wettable or is made to be wettable by the solution. Metals which are useful for manufacturing the structured packing include steel, stainless steel, nickel, and various steel alloys including proprietary alloys such as Inconel®, Monel®, Carpenter 20®, Hastelloy©, and nickel, titanium, aluminum, tantalum, zirconium, and silver-plated copper. Preferred structured packing material comprises stainless steel, particularly stainless steel having an AISI grade 304, 304L, 316 or a martensitic 400 series alloy. Preferred metal filaments used in a structured packing material have a nominal diameter of between about 0.002 in. and 0.008 in. Nonmetallic materials that may be useful include polypropylene, Teflon® (TFE), Tefezel® (ETFE), Halcar® (ECTFE), Kynar® (PVDF), polyester, polyethylene, and the like. Ammonia-compatible plastic such as polypropylene in the lower temperature sections such as the rectifier are useful for packing material in the present invention.

The structured packing used in the one or more sections becomes more efficient when liquid and vapor are evenly distributed over the packing. Although structured packing material is very effective at quickly distributing liquid, it is important to use liquid distributors to reduce the amount of poor distribution at the feed points and minimize the need for added packed height to achieve the required distribution. Distributors may be used effectively at the feed points as well as where the shell of the column is separated into different segments. Such distributors may be in the form of sprayers, nozzles, jets, etc. positioned within the column for achieving such uniform distribution.

The structured packing used in one or more sections of the generator is optimized for various liquid or vapor loadings or optimized for cost-effectiveness. Such optimizations are achieved by changing mesh size and filament sizes of the material from which the packing is fabricated. These changes typically result in packing with different densities (weight per superficial volume of packing), with densities in the range of 25 to 40 lbs./cu. ft. and more preferably between about 30 and about 35 lbs./cu. ft., having the greatest efficiency. Another advantage of structured packing relative to other distillation mass transfer devices is the relatively high liquid and vapor loading possible, which translates to smaller generator shell diameters for a given capacity. Small diameters mean lower cost and more effective transfer of heat to or from the shell, thereby eliminating the need for costly internal heat exchange structures. The packing is installed in one or more of the generator sections having a cross-section within the one or more sections at a design capacity of at least less than about 0.2 sq. in./lb./hr of ammonia refrigerant at the design capacity of the generator. More preferably, the inside cross-section area of the packing in the one or more sections is 0.15 sq. in./lb./hr of ammonia refrigerant, or less. In some cases it is possible to operate as low as 0.05 sq. in./lb./hr resulting in greatly reduced generator column diameter. Moreover, efficient separation may be carried out in a generator column of relatively small diameter as compared to present commercial absorption generators. For example, utilizing a structured packing as described above in one or more sections of a generator of 60,000 Btuh, nominal cooling capacity GAX aqua-ammonia absorption cycle can be as small as 2.75 in. ID compared to a 6 in. diameter generator column having a commonly used plate-type component heat exchanger. Commercial equipment for a 3 RT cooling in a commonly used 6 in. ID generator requires about 72 lb./hr refrigerant equivalent to about 0.39 in.$^2$/lb./hr refrigerant. By contrast, a column installed with structured packing according to the invention operates with normalized cross-sectional area as low as 0.05 in.$^2$/lb./hr refrigerant generation.

There are a number of options which may be used in the generator in order to facilitate heat input and heat recovery. For example, tubing may be wrapped for carrying weak liquor around the outside of the column, in which case the tubing should be installed for good thermal contact with the shell. Brazing or soldering the tube to the shell are typical means for obtaining such increased thermal contact. The heat transfer coil may also be placed inside the generator shell with the coil against the shell wall and structured packing fitted snugly inside the tubing coil. With solution in the generator contacting the heat transfer coil directly, good thermal contact to the packing is not critical and good thermal contact with the shell not desired. A fluid flow passageway for heat transfer fluid may be formed by concentric shells separated by spiral fins, which may be secured to either of the shell walls. Heat transfer passages may also be provided by using spiral fins with a fluid boundary between the weak liquor and solution in the generator.

Various other configurations within the generator column sections may be used, such as passing flue gas through the center of the boiler for effective heat input. It may also be beneficial to remove additional heat from the flue gas into the SHD and GAX sections of the generator, for example by passing the flue gas duct through the center of these sections which are otherwise filled with the structured packing material. The generator column may also be jacketed with flue gas ducting for heat recovery as an alternative to passing the gas through the center of the column.

Figure 2:
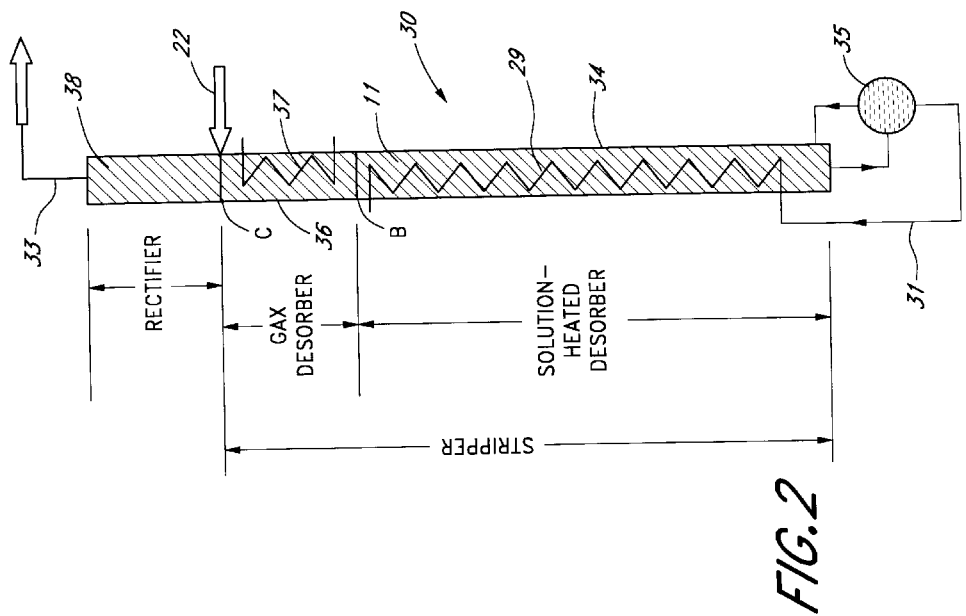
FIGS. 1, 2 and 3 are side sectional schematic illustrations of embodiments of a generator according to the invention illustrating the different sections of the generator filled with structured packing.

FIG. 2 illustrates an alternative embodiment of a generator column 30 in which the boiler is replaced by a reboiler 35 for inputting prime heat from a suitable source. Heat from the reboiler is directed via conduit system 31 into the SHD section 34 via a heat transfer piping 29. The column includes a GAX desorber section 36 extending between levels B and C, level C being a preferred position for inputting single-phase strong liquor from the absorber. The heat-transfer coil 37 is installed in GAX desorber section 36. The column further includes a rectifier section 38 with piping 33 for directing refrigerant vapor to a condenser. Again, although all of the sections of the generator column are shown with structured packing 11, for many uses packing will not be used in all sections. A single feed 22 is shown in this example.

Figure 3:
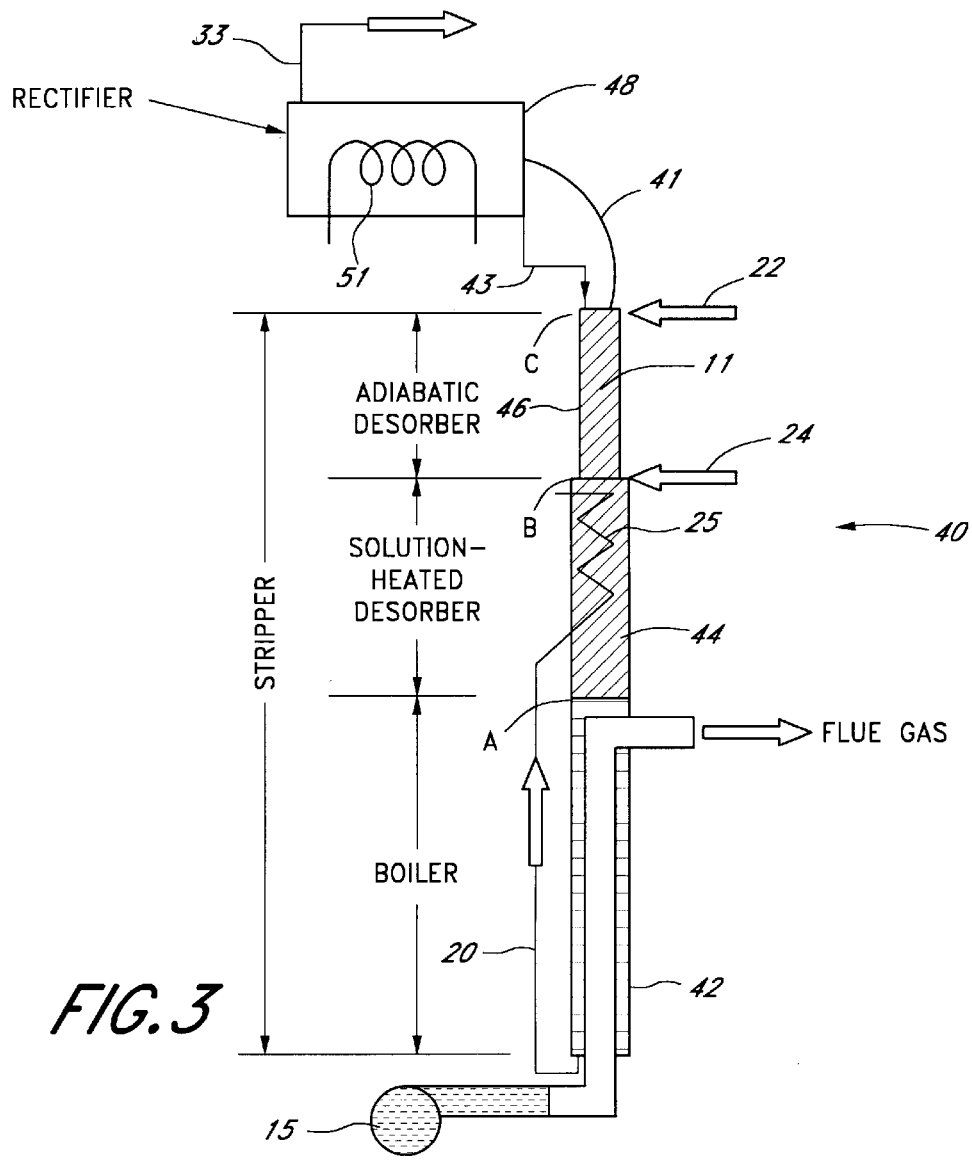

FIG. 3 illustrates another embodiment of a generator column 40 which includes a boiler section 42 through which flue gas from a burner 15 is directed. Heat from the boiler section is transferred via piping 20 into the SHD section 44 which extends between levels A and B. The heat is distributed in the SHD section via heat-transfer coil 25. Adiabatic desorber section 46 extends between levels B and C. The SHD and adiabatic desorber sections are substantially filled with structured packing 11. Piping 41 directs vapor from the adiabatic desorber section to rectifier section 48 with condensate returned to the adiabatic desorber via pipe 43. Conduit 33 directs refrigerant vapor to a condenser. In the embodiment illustrated, it will be noted that there is no GAX heat transfer section, and the adiabatic section of the column is smaller diameter than the boiler and the SHD section. Structured packing 11 is used only in the SHD section 44 and the adiabatic desorber section 46. A partial condenser 51 is used in the rectifier 48 and the rectifier is housed in a separate shell from the rest of the generator. FIG. 1 shows a boiler combined with an adiabatic section, while FIG. 2 has a reboiler combined with a GAX section. Theses combinations are for illustration and definition purposes only. It is also possible to combine a boiler with a GAX sections and to combine a reboiler with a column having an adiabatic section.

Although water-ammonia solutions have a very low tendency to create froth or foam, the aqua-ammonia absorption compositions commonly contain corrosion inhibitors such as sodium chromate and sodium hydroxide which tend to impart frothing to the compositions. Because structured packing material is sensitive to flooding in the presence of foam or froth, it is beneficial and preferential to use mechanical or chemical means for controlling the froth or foaming, especially for some levels of liquid or vapor loading. Most frothing occurs in the boiler section of the column. Thus, it is preferred to use mechanical foam breakers between the boiler and the SHD sections. A loose wire mesh is one example of a useful mechanical foam breaker. Another useful mechanical foam breaker is simply a void volume between the sections which prevents or reduces froth from entering the SHD from the boiler. Chemicals may also be used for froth control and include reducing the hydroxide content below the normal level of 0.15% sodium hydroxide. Alternative inhibitors include proprietary materials such as Advaguard 1000® or inhibitors avoiding the use of sodium chromate and/or sodium hydroxide. Further chemical means of reducing froth or foam include using antimony containing corrosion inhibitors.

Advantages in using structured packing in a generator column include the use of shorter columns, especially in the small-diameter columns. Such a generator also has a substantially reduced cost compared to complex distillation plates with attached heat transfer tubing and other presently used generator designs. Higher efficiency cycles are achieved by accomplishing the required separation with less reflux. Moreover, small-diameter generators result in lighter systems, less solution inventory, smaller packages, and faster startup. These as well as other advantages of the invention will be evident to those skilled in the art.

What is claimed is:

1. An aqua-ammonia absorption apparatus comprising an absorber assembly, a generator assembly, a condenser and an evaporator, said generator assembly comprising a boiler section or a reboiler, a solution-heated-desorber section, an adiabatic desorber or GAX desorber section, and a rectifier section, the interior space of at least one of said sections of said generator being substantially filled with structured packing material having a substantially uniform density throughout its mass and inert to an aqueous ammonia solution at generator temperatures.

2. Apparatus of claim 1 wherein the generator section filled with said structured packing material is the adiabatic desorber section.

3. Apparatus of claim 1 wherein the generator section filled with said structured packing material is the rectifier section.

4. Apparatus of claim 1 wherein the generator section filled with said structured packing material is the solution-heated-desorber section.

5. Apparatus of claim 1 wherein the generator section filled with said structured packing material is the boiler section.

6. Apparatus of claim 5 wherein said boiler section comprises a cylindrical shell having a concentric flue pipe therein and an annular space therebetween, and wherein said annular space is substantially filled with said structured packing material.

7. Apparatus of claim 1 wherein the generator sections filled with said structured material are the rectifier and adiabatic desorber sections.

8. Apparatus of claim 1 wherein the generator sections filled with said structured packing material are the rectifier and solution-heated-desorber sections.

9. Apparatus of claim 1 wherein the generator sections filled with said structured packing material are the rectifier and boiler sections.

10. Apparatus of claim 9 wherein said boiler section comprises a cylindrical shell having a concentric flue pipe therein and an annular space therebetween, and wherein said annular space is substantially filled with said structured packing material.

11. Apparatus of claim 1 wherein the generator sections filled with said structured packing material are the adiabatic desorber and solution-heated-desorber sections.

12. Apparatus of claim 1 wherein the generator sections filled with said structured packing material are the adiabatic desorber and boiler sections.

13. Apparatus of claim 11 wherein said boiler section comprises a cylindrical shell having a concentric flue pipe therein and an annular space therebetween, and wherein said annular space is substantially filled with said structured packing material.

14. Apparatus of claim 1 wherein the generator sections filled with said structured packing material are the rectifier, adiabatic desorber and solution-heated-desorber sections.

15. Apparatus of claim 1 wherein the generator sections filled with said structured packing material are the rectifier, adiabatic desorber and boiler sections.

16. Apparatus of claim 15 wherein said boiler section comprises a cylindrical shell having a concentric flue pipe therein and an annular space therebetween, and wherein said annular space is substantially filled with said structured packing material.

17. Apparatus of claim 1 wherein the generator sections filled with said structured packing material are the adiabatic desorber, solution-heated-desorber and boiler sections.

18. Apparatus of claim 17 wherein said boiler section comprises a cylindrical shell having a concentric flue pipe therein and an annular space therebetween, and wherein said annular space is substantially filled with said structured packing material.

19. Apparatus of claim 1 wherein all of said generator sections are substantially filled with said structured packing material.

20. Apparatus of claim 19 wherein said boiler section comprises a cylindrical shell having a concentric flue pipe therein and an annular space therebetween, and wherein said annular space is substantially filled with said structured packing material.

21. Apparatus of claim 1 wherein the generator section filled with said structured packing material is the GAX desorber section.

22. Apparatus of claim 1 wherein the generator sections filled with said structured packing material are the rectifier and GAX desorber sections.

23. Apparatus of claim 1 wherein the generator sections filled with said structured packing material are the GAX desorber and solution-heated-desorber sections.

24. Apparatus of claim 1 wherein said generator sections filled with said structural packing material are the boiler and GAX desorber sections.

25. Apparatus of claim 24 wherein said boiler section comprises a cylindrical shell having a concentric flue pipe therein and an annular space therebetween, and wherein said annular space is substantially filled with said structured packing material.

26. Apparatus of claim 1 wherein the generator sections filled with said structured packing material are the rectifier, GAX desorber and solution-heated-desorber sections.

27. Apparatus of claim 1 wherein the generator sections filled with said structured packing material are the rectifier, GAX desorber and boiler sections.

28. Apparatus of claim 27 wherein said boiler section comprises a cylindrical shell having a concentric flue pipe therein and an annular space therebetween, and wherein said annular space is substantially filled with said structured packing material.

29. Apparatus of claim 1 wherein the generator sections filled with said structured packing material are the GAX desorber, solution-heated-desorber and boiler sections.

30. Apparatus of claim 29 wherein said boiler section comprises a cylindrical shell having a concentric flue pipe therein and an annular space therebetween, and wherein said annular space is substantially filled with said structured packing material.

31. Apparatus of claim 1 comprising a heat pump.

32. Apparatus of claim 1 comprising chiller.

33. Apparatus of claim 1 comprising a GAX heat pump.

34. Apparatus of claim 1 comprising a GAX chiller.

35. Apparatus of claim 1 comprising a heating only apparatus.

36. Apparatus of claim 1 comprising a chiller-heater.

37. Apparatus of claim 1 wherein at least one of said solution-heated-desorber section, GAX desorber section or rectifier section comprises a generally vertical shell having tubing for directing weak absorption solution therein extending around the interior of said shell and in heat exchange communication therewith.

38. Apparatus of claim 1 wherein at least one of said solution-heated-desorber section, GAX desorber section or rectifier section comprises a generally vertical shell having tubing for directing weak absorption solution therein secured around the exterior of said shell and in heat exchange communication therewith.

39. Apparatus of claim 1 wherein at least one of said solution-heated-desorber section, GAX desorber section or rectifier section incorporates a heat exchange fluid flow passageway comprising first and second concentric shells having heat exchange fins secured therebetween.

40. Apparatus of claim 1 wherein said structured packing material comprises stainless steel.

41. Apparatus of claim 40 wherein said stainless steel comprises stainless steel AISI grade 304, 304L, 316 or a martensitic 400 series alloy.

42. Apparatus of claim 41 wherein said structured packing material comprises layers of knitted wire mesh.

43. Apparatus of claim 1, 40, 41 or 42 wherein said structured packing material comprises metal filaments having a nominal diameter of between about 0.002 in. and 0.008 in.

44. Apparatus of claim 1 wherein said structured packing material comprises carbon steel.

45. Apparatus of claim 1 wherein said structured packing material in at least one of said sections comprises a non-metallic composition.

46. Apparatus of claim 45 wherein said structured packing material in one or more of said sections comprises polypropylene.

47. Apparatus of claim 46 wherein said section containing polypropylene structured packing material is the rectifier section.

48. Apparatus of claim 1, 40, 41, 42, or 43 or wherein said structured packing material in said one or more sections of said generator has a density of between about 25 and about 40 lbs./cu. ft.

49. Apparatus of claim 48 wherein said density is between about 30 and about 35 lbs./cu. ft.

50. Apparatus of claim 1, 40, 41, 42, 45 or 46 wherein the inside cross-section of said generator section containing structured packing material is less than about 0.2 sq. in./lb./hr of ammonia refrigerant at the design capacity of the generator.

51. Apparatus of claim 50 wherein the inside cross-section area of one or more of said sections is 0.15 sq. in./lb./hr of ammonia refrigerant, or less.

52. Apparatus of claim 50 wherein the inside cross-section area of one or more of said sections is 0.05 sq. in./lb./hr of ammonia refrigerant, or less.

53. Apparatus of claim 1 including one or more devices in at least one of said sections of said generator for uniformly distributing liquid onto said structured packing material.

54. Apparatus of claim 53, wherein said generator including an inlet for feeding lower-temperature liquid therein and an inlet for feeding higher-temperature liquid therein, and wherein said one or more devices distributes lower-temperature liquid in said generator.

55. Apparatus of claim 53, wherein said generator including an inlet for feeding lower-temperature liquid therein and an inlet for feeding higher-temperature liquid therein, and wherein said one or more devices distributes higher-temperature liquid in said generator.

56. Apparatus of claim 53, wherein said generator including an inlet for feeding lower-temperature liquid therein and an inlet for feeding higher-temperature liquid therein, and comprising one or more devices for distributing lower-temperature liquid and one or more devices for distributing higher-temperature liquid therein.

57. Apparatus of claim 53 wherein said rectifier section comprises a separate shell from said adiabatic desorber section or said GAX desorber section, and wherein said one or more devices uniformly distributes liquid from said rectifier section into said adiabatic desorber section or said GAX desorber section.

58. Apparatus of claim 53 wherein said one or more devices directs and distributes liquid from an interior wall surface of one or more of said sections onto said structured packing material.

59. Apparatus of claim 1 comprising mechanical and/or chemical foam control in said generator for controlling foam and/or froth in said structured packing material.

60. Apparatus of claim 59 comprising a mechanical foam control in and/or between said one or more sections.

61. Apparatus of claim 60 wherein said mechanical foam control comprises vertical spacing between the lowest end of the solution-heated-desorber section and the highest end of the boiler or reboiler section.

62. Apparatus of claim 59 wherein said foam control comprises chemical foam control.

63. Apparatus of claim 62 wherein said chemical foam control comprises an aqueous ammonia solution having a hydroxide content of 250 ppm or less.

64. Apparatus of claim 62 wherein said chemical foam control comprises an antimony containing corrosion inhibitor.

65. An aqua-ammonia absorption apparatus comprising an absorber assembly, a generator assembly, a condenser and an evaporator, said generator assembly comprising a boiler section, a solution-heated-desorber section, an adiabatic desorber or GAX desorber section, and a rectifier section, the interior space of at least one of said sections of said generator being substantially filled with structured packing material having a substantially uniform density throughout its mass and inert to an aqueous ammonia solution at generator temperatures, said generator having a design capacity at rating conditions of 95° F. ambient temperature for cooling of 100 to 150 lbs./hr ammonia refrigerant, and wherein at least one of said sections has an inside diameter of less than about 6 in.

66. Apparatus of claim 65 wherein one or more of said section have an inside diameter of about 4.5 in. or less.

67. Apparatus of claim 65 wherein one or more of said section have an inside diameter of about 3.5 in. or less.

68. An aqua-ammonia absorption apparatus comprising an absorber assembly, a generator assembly, a condenser and an evaporator, said generator assembly comprising a boiler section, a solution-heated-desorber section, an adiabatic desorber or GAX desorber section, and a rectifier section, the interior space of at least one of said sections of said generator being substantially filled with structured packing material having a substantially uniform density throughout its mass and inert to an aqueous ammonia solution at generator temperatures, said generator having a design capacity at rating conditions of 95° F. ambient temperature for cooling of 50 to 100 lbs./hr ammonia refrigerant, and wherein at least one of said sections has an inside diameter of less than about 6 in.

69. Apparatus of claim 68 wherein one or more of said sections have an inside diameter of about 4 inches or less.

70. Apparatus of claim 68 wherein one or more of said sections have an inside diameter of about 3 inches or less.

71. An aqua-ammonia absorption apparatus comprising an absorber assembly, a generator assembly, a condenser and an evaporator, said generator assembly comprising a boiler section, a solution-heated-desorber section, an adiabatic desorber or GAX desorber section, and a rectifier section, the interior space of at least one of said sections of said generator being substantially filled with structured packing material having a substantially uniform density throughout its mass and inert to an aqueous ammonia solution at generator temperatures, said generator having a design capacity at rating conditions of 95° F. ambient temperature for cooling of 125 to 250 lbs./hr ammonia refrigerant, and wherein at least one of said sections has an inside diameter of less than about 6 in.

72. An aqua-ammonia absorption apparatus comprising an absorber assembly, a generator assembly, a condenser and an evaporator, said generator assembly comprising a boiler section, a solution-heated-desorber section, an adiabatic desorber or GAX desorber section, and a rectifier section, the interior space of at least one of said sections of said generator being substantially filled with structured packing material having a substantially uniform density throughout its mass and inert to an aqueous ammonia solution at generator temperatures, said generator having a design capacity at rating conditions of 95° F. ambient temperature for cooling of 2.5 to 3.5 refrigeration tons, and wherein at least one of said sections has an inside diameter or less than about 6 in.

73. Apparatus of claim 72 wherein one or more of said sections have an inside diameter of about 4 inches or less.

74. Apparatus of claim 72 wherein one or more of said sections have an inside diameter of about 3 inches or less.

75. An aqua-ammonia absorption apparatus comprising an absorber assembly, a generator assembly, a condenser and an evaporator, said generator assembly comprising a boiler section, a solution-heated-desorber section, an adiabatic desorber or GAX desorber section, and a rectifier section, the interior space of at least one of said sections of said generator being substantially filled with structured packing material having a substantially uniform density throughout its mass and inert to an aqueous ammonia solution at generator temperatures, said generator having a design capacity at rating conditions of 95° F. ambient temperature for cooling 3.4 to 4.5 refrigeration tons, and wherein at least one of said sections has an inside diameter of less than about 6 in.

76. Apparatus of claim 75 wherein one or more of said sections have an inside diameter of about 4 inches or less.

77. Apparatus of claim 75 wherein one or more of said sections have an inside diameter of about 3 inches or less.

78. An aqua-ammonia absorption apparatus comprising an absorber assembly, a generator assembly, a condenser and an evaporator, said generator assembly comprising a boiler section, a solution-heated-desorber section, an adiabatic desorber or GAX desorber section, and a rectifier section, the interior space of at least one of said sections of said generator being substantially filled with structured packing material having a substantially uniform density throughout its mass and inert to an aqueous ammonia solution at generator temperatures, said generator having a design capacity at rating conditions of 95° F. ambient temperature for cooling of 4.5 to 5.5 refrigeration tons, and wherein at least one of said sections has an inside diameter of less than about 6 in.

79. Apparatus of claim 75 wherein one or more of said sections have an inside diameter of about 4.5 inches or less.

80. An aqua-ammonia absorption apparatus comprising an absorber assembly, a generator assembly, a condenser and an evaporator, said generator assembly comprising a boiler section, a solution-heated-desorber section, an adiabatic desorber or GAX desorber section, and a rectifier section, the interior space of at least one of said sections of said generator being substantially filled with structured packing material having a substantially uniform density throughout its mass and inert to an aqueous ammonia solution at generator temperatures, said generator having a design capacity at rating conditions of 95° F. ambient temperature for cooling of 6 to 8 refrigeration tons, and wherein at least one of said sections has an inside diameter of less than about 6 in.

81. Apparatus of claim 1 wherein the said sections of said generator assembly comprise one shell.

82. Apparatus of claim 1 wherein the said sections of said generator assembly comprise two or more shells.

83. Apparatus of claim 1 wherein said rectifier section is housed in a separate shell from the other said sections of said generator assembly.

84. An aqua-ammonia absorption apparatus comprising an absorber assembly, a generator assembly, a condenser and an evaporator, said generator assembly comprising a solution-heated-desorber section, an adiabatic desorber or GAX desorber section, and a rectifier section, wherein at least a portion of the interior space of said generator assembly is substantially filled with structured packing material having a substantially uniform density throughout its mass and inert to an aqueous ammonia solution at generator temperatures.

85. Apparatus of claim 84 wherein the adiabatic desorber section is substantially filled with said structured packing material.

86. Apparatus of claim 84 wherein the rectifier section is substantially filled with said structured packing material.

87. Apparatus of claim 84 wherein the solution-heated-desorber section is substantially filled with said structured packing material.

88. Apparatus of claim 84 wherein the generator assembly includes a boiler section.

89. Apparatus of claim 84 wherein the generator assembly includes a boiler section substantially filled with said structured packing material.

90. Apparatus of claim 88 wherein said boiler section comprises a cylindrical shell having a concentric flue pipe therein and an annular space therebetween, and wherein said annular space is substantially filled with said structured packing material.

91. Apparatus of claim 84 or 88 wherein at least one of said sections is substantially filled with said structured packing material.

92. Apparatus of claim 84 or 88 wherein two or more of said sections are substantially filled with said structured packing material.

93. Apparatus of claim 84, 85, 86 or 87 including a reboiler for heating said generator assembly.

94. Apparatus of claim 92 including a reboiler for heating said generator assembly.

95. Apparatus of claim 93 wherein the said sections of said generator assembly comprise one shell.

96. Apparatus of claim 93 wherein the said sections of said generator assembly comprise two or more shells.

97. Apparatus of claim 93 wherein said rectifier section is housed in a separate shell from the other said sections of said generator assembly.

98. An aqua-ammonia absorption apparatus comprising an absorber assembly, a generator assembly, a condenser and an evaporator, said generator assembly comprising a stripping section and a rectifier section and wherein at least a portion of the interior space of said generator assembly is substantially filled with structured packing material having a substantially uniform density throughout its mass and inert to an aqueous ammonia solution at generator temperatures.

99. Apparatus of claim 98 wherein at least a portion of the stripping section is substantially filled with said structured packing material.

100. Apparatus of claim 98 wherein the rectifier section is substantially filled with the structured packing material.

101. Apparatus of claim 98, 99 or 100 wherein said structured packing material comprises stainless steel or carbon steel.

102. Apparatus of claim 101 wherein said structured packing material comprises layers of knitted wire mesh.

103. Apparatus of claim 98, 99 or 100 wherein said structured packing material comprises a non-metallic composition.

104. Apparatus of claim 98, 99 or 100 wherein said structured packing material comprises polypropylene.

* * * * *